(12) United States Patent
Scobey

(10) Patent No.: US 6,791,758 B1
(45) Date of Patent: Sep. 14, 2004

(54) OPTICAL ETALONS AND METHODS OF MAKING AND USING THEM

(75) Inventor: Michael A. Scobey, Santa Rosa, CA (US)

(73) Assignee: Cierra Photonics Inc., Santa Rosa, CA (US)

( * ) Notice: Subject to any disclaimer, the term of this patent is extended or adjusted under 35 U.S.C. 154(b) by 173 days.

(21) Appl. No.: 10/096,001

(22) Filed: Mar. 12, 2002

Related U.S. Application Data

(60) Provisional application No. 60/276,019, filed on Mar. 15, 2001.

(51) Int. Cl.[7] .................................................. G02B 1/10
(52) U.S. Cl. ........................ 359/584; 359/580; 356/454
(58) Field of Search ................................. 359/260, 580, 359/582, 584, 589; 356/519, 454; 156/99

(56) References Cited

U.S. PATENT DOCUMENTS

| | | | |
|---|---|---|---|
| 5,144,498 A | * 9/1992 | Vincent | .................. 359/885 |
| 5,212,584 A | * 5/1993 | Chung | .................... 359/260 |
| 5,283,845 A | 2/1994 | Ip | |
| 5,784,507 A | * 7/1998 | Holm-Kennedy et al. | .... 385/31 |
| 5,982,488 A | 11/1999 | Shirasaki | |
| 6,110,337 A | 8/2000 | Sullivan et al. | |
| 6,125,220 A | 9/2000 | Copner et al. | |
| 6,678,093 B1 | * 1/2004 | Scobey et al. | .............. 359/578 |

* cited by examiner

*Primary Examiner*—Mark A. Robinson
*Assistant Examiner*—Alessandro Amari
(74) *Attorney, Agent, or Firm*—Peter D. McDermott

(57) ABSTRACT

An improved etalon has a bulk optic defining the optic cavity between selectively transparent thin film mirror coatings. The bulk optic comprises an optically transparent body, such as a portion of a substrate wafer, along with a wedge correcting coating on at least one of the two surfaces of the optically transparent body and/or a thickness-adjustment layer on one or both surfaces. The wedge coating establishes high precision parallelism of the selectively transparent surfaces of the etalon. The bulk optic is a solid, self-supporting body, optically transparent (at the wavelength or wavelengths of interest), whose thickness, i.e., the dimension between the selectively transparent surfaces, defines the cavity spacing of the etalon. Optical elements and optical communication systems incorporating the novel etalons are disclosed, as well as methods of producing the etalons.

11 Claims, 5 Drawing Sheets

OPTICAL ETALONS AND METHODS OF MAKING AND USING THEM

PRIORITY APPLICATION

This application claims the benefit of U.S. Provisional Application No. 60/276,019 filed on Mar. 15, 2001 and titled "Optical Etalons and Methods of Making and Using Them."

CROSS-REFERENCED APPLICATIONS

This application is related to commonly assigned U.S. Provisional Application No. 60/275,939 filed on Mar. 15, 2001 and titled "Apparatus and Method for Vacuum Coating Deposition," U.S. Provisional Application No. 60/276,022 filed on Mar. 15, 2001 and titled "Optical System With 1×N Interleaver and Methods of Making and Using Same," U.S. Provisional Application No. 60/275,918 filed on Mar. 15, 2001 and titled "Optical System. With Cascaded Interleavers and Methods of Making and Using Same," U.S. Provisional Application No. 60/276,018 filed on Mar. 15, 2001 and titled "Optically Coupled Etalons and Methods of Making and Using Same," U.S. Provisional Application No. 60/275,920 filed on Mar. 15, 2001 and titled "Iso-Optical Thermal Compensator and Methods of Making and Using Same," U.S. Provisional Application No. 60/275,998 filed on Mar. 15, 2001 and titled "Methods of Making Optical Etalons," U.S. Provisional Application No. 60/276,017 filed on Mar. 15, 2001 and titled "Optical System With Interleaver and Methods of Making and Using Same," U.S. Provisional Application No. 60/275,997 filed on Mar. 15, 2001 and titled "Optical Filter Elements and Methods of Making and Using Same," U.S. Provisional Application No. 60/276,020 filed on Mar. 15, 2001 and titled "Wafer Scale Production of Optical Elements," U.S. Provisional Application No. 60/276,023 filed on Mar. 15, 2001 and titled "Air Space Variable Optical Etalons and Methods of Making and Using Same," U.S. Provisional Application No. 60/275,945 filed on Mar. 15, 2001 and titled "Air Space Optical Etalons and Methods of Making and Using Same," and U.S. Provisional Application No. 60/276,316 filed on Mar. 16, 2001 and titled "Optical Monitoring of Thin Film Deposition Thickness," the entire disclosure of each of which is hereby incorporated herein by reference for all purposes.

INTRODUCTION

This invention relates to new optical etalons and to methods of making and using them, as well as to devices incorporating such etalons.

BACKGROUND

Etalons are ubiquitous in optical systems, such as optical sensors, optical communication systems, etc. The basic Fabry-Perot etalon can be designed and produced to have a sharp response at resonant frequencies, which makes them suitable as optical filters, such as passband filters. They also give a variable amount of dispersion, and so have been suggested for possible use as dispersion compensators. Thus Fabry-Perot etalons are a basic building block in a number of different optical elements, i.e., in optically functional components or devices. Such devices may be active or passive and may be employed in a system (or adapted to be employed in a system) to pass or transmit a selective wavelength or band of wavelengths or periodic set of wavelength bands. Exemplary optical elements in which etalons are used include optical sensors, and filters, e.g., band pass filters, single channel filters, and other wavelength selective filter devices such as wavelength division multiplexers, and dispersion compensators and other components of optical communication systems.

Fabry-Perot etalons typically comprise precisely parallel, selectively transmissive surfaces, such as thin films, i.e., partially reflective mirrors or surfaces on opposite sides of an integral number of half waves distance or gap between them, forming the etalon's cavity. The thin film and cavity characteristics determine the optical properties of the etalon. That is, the spectral characteristics of the etalon are generally determined by the reflectivity of the mirrors or surfaces and by the optical thickness of the cavity. Such etalons have long been produced, for example, by sputter deposition of film stacks of alternating layers of materials, i.e., a high refractive index material alternating with a low refractive index material, to form a mirror coating which is transmissive of selected wavelengths. Two such mirror coatings sandwich a sputter-deposited cavity layer between them. Sputtering or other physical deposition of the relatively thick cavity layer is time consuming and, therefore, adds substantial time and cost to the production of such etalons. The result is undesirably high cost of production for such etalons.

It has long been a recognized problem in this industry, that producing etalons having desired properties can be difficult and expensive. In addition, there are industry-recognized problems associated with producing structurally robust etalons having desired, precise optical properties. Prior known etalons have employed various designs, such as the etalons used in the interferometric optical devices of U.S. Pat. No. 6,125,220 to Copner et al. In the interleaver/de-interleaver devices of Copner et al, two glass interferometric end plates are separated by a spacer region where the etalon is formed. The spacer region is an air gap having a predetermined dimension. In adjustable Fabry-Perot devices, such as disclosed in U.S. Pat. No. 5,283,845 to Ip, tuning of the center wavelength of the spectral passband of an etalon is achieved by varying the effective cavity length (spacing) between two end plates carrying Fabry-Perot thin film reflectors. More specifically, in Ip a piezo actuator is used, extending between the two end plates. By varying the electric power applied to the piezo actuator, the axial length of the actuator can be varied, and thus the gap between the end plates varied. As alternatives to piezo-electric actuators, the tuning mechanism may include liquid crystals, temperature, pressure, and other mechanisms. It is a disadvantage that adjustable etalons as in Ip involves considerable assembly complexity and cost. Also, maintaining strict parallelism between the end plates can present additional difficulties.

The prior known optical etalons, as noted above, fail to fully meets the needs of many applications, especially for optical elements intended for optical communication systems, precision sensors, etc.

It is an object of the present invention to provide etalons addressing some of the deficiencies of the prior known technologies. It is a particular object of at least certain preferred embodiments, to provide improved etalons and methods of making same, and optical elements incorporating such etalons. Additional objects and aspects of the invention and of certain preferred embodiments of the invention will be apparent from the following disclosure and detailed description.

SUMMARY

In accordance with a first aspect, an etalon comprises a planar bulk optic having first and second parallel, selectively transparent surfaces. The bulk optic comprises an optically transparent body and a wedge correcting coating (referred to here generally as a "wedge coating") on at least one of the two surfaces of the optically transparent body. The wedge coating, further described below, establishes high precision parallelism of the selectively transparent surfaces of the etalon. The bulk optic is a solid, optically transparent (at the wavelength or wavelengths of interest) body whose thickness, i.e., the dimension between the selectively transparent, parallel surfaces, including the wedge coating, defines the cavity spacing. In particular, the bulk optic, including the wedge coating, will typically have an optical thickness equal to an integral number of half-waves for the wavelength(s) of interest. In preferred embodiments the selectively transparent surfaces are thin film coatings comprising, for example, a film stack of alternating high and low refractive index oxides or a metal thin film in accordance with known thin film technologies.

The thickness of the wedge coating varies progressively across the etalon. That is, the thickness of the wedge coating, viewed in cross-section in at least one plane orthogonal to the parallel, selectively transparent surfaces of the etalon, has a thickness that increases (or decreases in the opposite direction) continuously, typically approximately linearly, to compensate for non-parallelism, or "wedge", in the underlying body of the bulk optic. As described further below, the bulk optic can be diced from a wafer on which a wedge coating and the two thin film coatings have been deposited by magnetron sputtering, ion beam sputtering or other known deposition techniques. Preferably, surface polishing is performed to first polish the wafer, for example, a silica wafer suitable for optical filter production, to parallelism within 1 to 2 arc seconds and wavefront error of less than 1/50 (2.0%) of a wave at the wavelength of interest. For an etalon intended for use as or in an optical element in an optical telecommunication system, the wavefront error will preferably be less than 1/50 of a wave at 1550 nm. Low wavefront error can be understood in this context to mean that the thickness of the bulk optic, i.e., the distance between the two opposite surfaces of the bulk optic, is substantially linearly variable and, hence, controllable or correctable by the wedge coating in accordance with the present disclosure. Preferably, for etalons suitable for use in optical communication elements, the wedge coating brings parallelism of the opposite surfaces of the bulk optic body from the 1 to 2 arc seconds of wedge mentioned above to less than 0.1 arc seconds, most preferably less than 0.01 arc seconds.

It is a significant advantage that the etalons disclosed here can employ a bulk optic, comprising the optically transparent body and the wedge coating, to define the cavity spacing of the etalon. Substantial cost savings and production simplification can be realized in accordance with at least certain preferred embodiments of the etalon. Further, robust and accurate etalons can be achieved using production techniques whose application will be readily understood by those skilled in the art given the benefit of this disclosure.

In accordance with a method aspect of the present disclosure, the wedge coating is deposited onto the optically transparent body of the bulk optic by physical vapor deposition, e.g., magnetron sputtering or ion beam sputtering in a vacuum chamber, with the bulk optic (alone or as part of a larger substrate, such as a typical 6 inch or larger substrate wafer used in the production of optical filters) not spinning during deposition. Preferably the coating is a low defect coating to allow bonding or other optical coupling. Deposition can be otherwise in accordance with known techniques, whose applicability and mariner of implementation will be within the ability of those skilled in the art given the benefit of this disclosure. The substrate is oriented at an angle to the target or otherwise arranged to receive progressively different deposition rates from one edge to the opposite edge. The target is preferably an elongate source to provide a coating with a roughly linear profile. Preferably, the target is tangential to the circumference of the substrate and is about four times as large as the substrate, e.g. for a 6 inch diameter substrate the target can be about 20 inches long. The thinnest point of the substrate is positioned closest to the target or otherwise oriented or favored to have the fastest rate of deposition. Conversely, the thickest point is positioned or oriented to have the lowest deposition rate. Thus, the sputtered material will deposit fastest and, therefore, the most heavily, i.e., the thickest, where the bulk optic was thinnest, with progressively thinner deposition toward the area where the least was wanted. Since the substrate is not spinning and is oriented or arranged as just described, the thickness of the resulting wedge coating will change progressively (hence the term "wedge"), with the change in the thickness of the wedge coating being opposite that of the underlying body. The net effect is that the thickness of the bulk optic is substantially uniform over all or a large portion of its area. Where the bulk optic is prepared in the form of a typical substrate wafer, Fabry-Perot thin films can then be deposited to complete the etalon (subject to any further production or packaging steps etc.) in the same or a different sputter deposition chamber. Deposition of a wedge coating and thin films on another, second surface of the bulk optic may be performed in accordance with the embodiments described here.

In accordance with another aspect, an etalon comprises a planar bulk optic having first and second selectively transparent surfaces. The bulk optic comprises an optically transparent body and a thickness-adjustment layer of substantially uniform thickness on at least one of the two surfaces of the optically transparent body. As used herein, substantially uniform thickness means the thickness of the layer across the surface of the bulk optic is approximately constant. The thickness-adjustment layer, further described below, establishes the desired thickness of the bulk optic cavity of the etalon. The bulk optic is a solid, optically transparent (at the wavelength or wavelengths of interest) body whose thickness, i.e., the dimension between the selectively transparent surfaces, including the thickness-adjustment layer coating, defines the cavity spacing. In particular, the bulk optic, including the thickness-adjustment layer, will typically have an optical thickness equal to an integral number of half-waves at same or all points for the wavelength(s) of interest. In preferred embodiments the selectively transparent surfaces are thin film coatings comprising, for example, a film stack of alternating high and low refractive index oxides or a metal thin film in accordance with known thin film technologies. As described further below, the bulk optic can be diced from a wafer on which a thickness-adjustment layer and the two thin film coatings have been deposited by magnetron sputtering, ion beam sputtering or other known deposition technique. Preferably, surface polishing is performed to first polish the wafer, for example, a silica wafer suitable for optical filter production, to parallelism within 1 to 2 arc seconds and wavefront error of less than 1/50 (2.0%) of a wave at the wavelength of interest. For an etalon intended for use as or in an optical element in an optical telecommunication system, the wavefront error will preferably be less than 1/50 of a wave at 1550 nm. In accordance with a further method aspect of the present disclosure, the thickness-adjustment layer is deposited by physical vapor deposition, most preferably magnetron or ion beam sputtering in a vacuum chamber, with the bulk optic (alone or as part of a larger substrate, such as a typical substrate wafer used in the production of optical filters) spinning during deposition in accordance with known techniques. From the disclosure above of optical elements comprising a bulk optic with a wedge coating as the cavity of the optical element, it will be apparent to those skilled in the art that embodiments of the present invention comprising a bulk optic with a thickness-adjustment layer and no wedge coating can be expected to have non-parallel surfaces carrying the optical thin films. The consequent impact on optical properties of the optical element may be addressed in accordance with suitable techniques, such as tilting of the optical element in use. Selected area of the optical element may provide optical properties meeting product specifications for an intended application. It is a significant advantage that the etalons disclosed here can employ a bulk optic, comprising the optically transparent body and the thickness-adjustment layer, to define the cavity of an etalon. Substantial cost savings and production simplification can be realized in accordance with at least certain preferred embodiments of the etalon. Further, robust and accurate etalons can be achieved using production techniques whose application will be readily understood by those skilled in the art given the benefit of this disclosure.

In accordance with another aspect, an etalon comprising a wedge coating in accordance with the above disclosure further comprises a thickness-adjustment layer. More particularly, the bulk optic comprises, in addition to the optically transparent body and the wedge coating, a thickness-adjustment layer as described above, preferably overlying the wedge coating. As noted above, the properties of an etalon will depend, in part, on the cavity spacing. Thus, in accordance with certain preferred embodiments, the thickness of the bulk optic is adjusted, typically after deposition of the wedge coating, by follow-on deposition of a thickness-adjustment layer. In accordance with a further method aspect of the present disclosure, the thickness-adjustment layer is deposited by physical vapor deposition, most preferably ion beam or magnetron sputtering in a vacuum chamber, with the bulk optic (alone or as part of a larger substrate, such as a typical substrate wafer used in the production of optical filters) spinning during deposition in accordance with known techniques. In accordance with certain highly preferred embodiments, the wedge coating and then the thickness-adjustment layer are deposited onto the bulk optic (again, either alone or as part of a larger substrate) in a single continuous step. The wedge coating is deposited as described above, by deposition onto the bulk optic substrate not spinning in the vacuum chamber. Upon completion of the wedge coating, the bulk optic substrate is caused to commence spinning without interruption in deposition. Deposition is, therefore, continuous for the wedge coating and the thickness-adjustment layer. To control the optical thickness of the cavity formed by the bulk optic, the thickness can be precisely monitored during deposition of the thickness-adjustment layer. Given the benefit of this disclosure, it will be within the ability of those skilled in the art to employ suitable techniques for monitoring and controlling the thickness of the bulk optic as the thickness-adjustment layer is being deposited. Suitable optical monitoring techniques are known, including, for example, that disclosed in U.S. Pat. No. 6,110,337 to Sullivan et al., entitled *Sputtering Method and Apparatus with Optical Monitoring*, the entire disclosure of which is hereby incorporated by reference.

In accordance with another aspect, additional cavities can be deposited on either surface of a bulk optic etalon by suitable deposition techniques, such as, for example, ion beam sputtering, magnetron sputtering, etc. That is, additional cavities can be formed on the bulk optic etalon. More specifically, following deposition of a suitable transition layer overlying the thin film stacks on either surface of the bulk optic etalon, a cavity can be deposited by, for example, sputtering a first suitable thin film coating or stack, such as a sequence of alternating H/L/H film, followed by deposition of a cavity film, followed by deposition of a second thin film coating or stack which preferably is substantially identical to the first thin film coating. Similarly, yet one or more such thin film etalons can be deposited thereafter employing suitable odd QWOT transition layers between, in accordance with thin film principles well known to those skilled in the art. Thus, the advantage of improved optical performance characteristics of a multi-cavity device can be achieved, incorporating a bulk optic etalon of the type disclosed above together with additional thin film etalons unitary therewith by depositing such thin film etalons thereon using sputtering or other suitable deposition techniques. Any suitable materials disclosed above, and other suitable materials known to those skilled in the art, may be used for the thin films of the thin film etalons including but not limited to $Ta_2O_5$, $ZrO_2$, $TiO_2$, $Al_2O_5$, $SiO_2$, and $MgF$. The multi-cavity deposition product, described above, is suitable for use, generally together with or in place of the single cavity embodiments of the bulk optic etalons disclosed here.

In accordance with another aspect, the etalons disclosed here may be incorporated into optical systems. Etalons can be directly optically coupled, as the term is used here, when they are optically coupled, i.e. are in the same optical path, and furthermore are in optical contact or are otherwise in physical contact with each other and/or mounted to each other (e.g. by bonding material in or out of the optical path) or mounted together in the same housing or by the same fixture. An air space may be separating the etalons or the etalons may be in direct surface-to-surface contact. Similarly, optical components in an optical system comprising the etalons disclosed here, that are directly optically coupled in accordance with the present disclosure, preferably have no intervening optical components performing substantial channel filtering or like optical operation on any passed signals. In particular, any signals passed by the etalons, or other optical components in the optical system, arrive at a second etalon, or other optical component, without any intervening wavelength filtering optical operations to add or drop passbands or like operations. One skilled in the art, given the benefit of this disclosure, will be able to design and assemble optical system comprising directly optically coupled etalons and other optical components described here.

The etalons disclosed above and the methods disclosed for their production will be recognized by those skilled in the art to represent a significant technological advance. Robust etalons can be produced meeting precise optical performance characteristics, with advantageously low production costs and good production flexibility. In preferred embodiments, the etalons have the advantageous attributes of small size, simple and potentially inexpensive construction, and good optical performance, including low loss, low polarization dependent loss and polarization mode dispersion, and low chromatic dispersion. Additional features and advantages will be understood from the following detailed description of certain preferred embodiments.

BRIEF DESCRIPTION OF THE DRAWINGS

Certain preferred embodiments of the invention will be described below with reference to the attached drawings in which.

Figure 1:
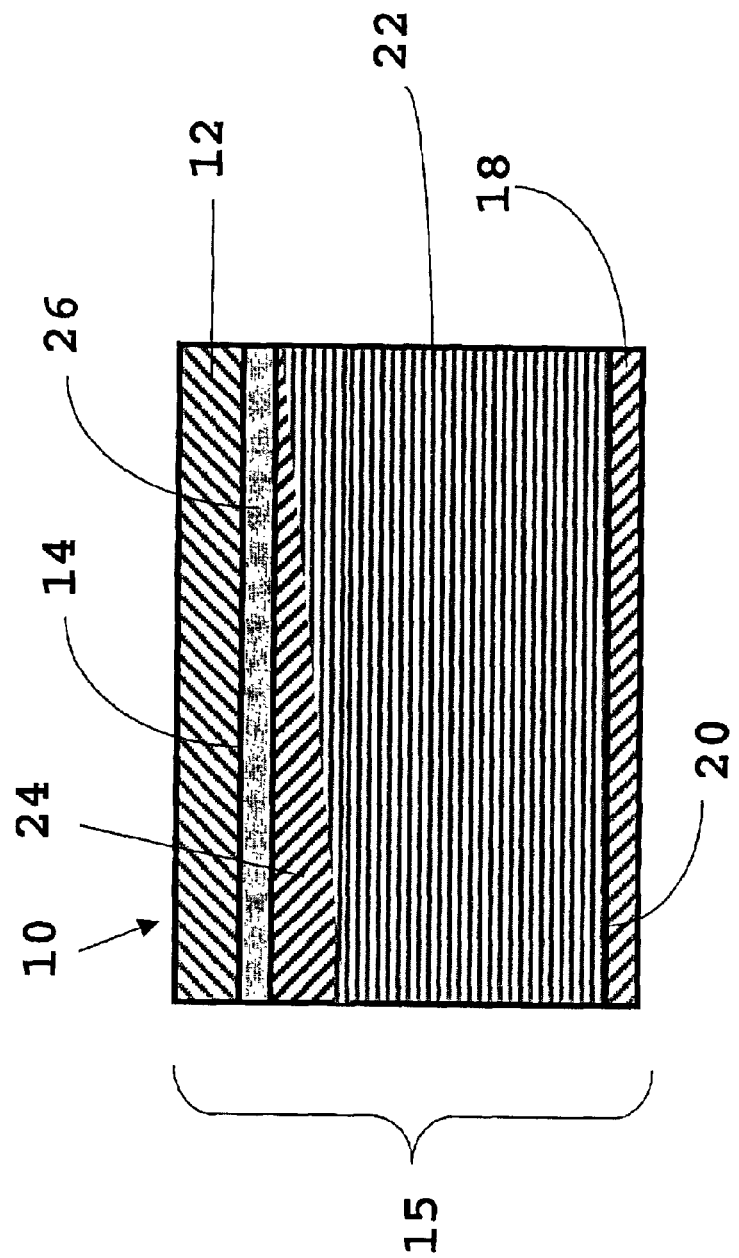
FIG. 1 is a schematic section view of an etalon in accordance with one preferred embodiment.

It will be apparent that the etalons shown in FIGS. 1–5 are not necessarily to scale. Certain dimensions, such as the thickness of thin film coatings, may have been enlarged relative to other dimensions, such as the thickness of the bulk optic, for clarity of illustration and ease of understanding. Directional references used in this disclosure and detailed description, and in the claims, refer to the orientation shown in FIG. 1 unless otherwise clear from context. It will be understood by those skilled in the art, that the devices disclosed here can be used generally in any orientation relative to gravity and/or other components to which they might be optically and/or physically coupled, e.g., by optical fiber or the like.

DETAILED DESCRIPTION OF CERTAIN PREFERRED EMBODIMENTS

It will be recognized from the above, that the novel etalons disclosed here can be formed in innumerable different configurations and sizes. The precise size and configuration of the etalon, including the choice of materials, design of the Fabry-Perot thin films, cavity spacing and the like will depend in large part on the particular application and use environment for which it is intended and its desired optical properties and performance characteristics. For convenience in this more detailed description of certain preferred embodiments, the etalons will generally be of a type suitable for use in optical elements of a fiberoptic telecommunication system. It will be within the ability of those skilled in the art, however, given the benefit of this disclosure, to select suitable materials and designs, as well as manufacturing techniques, for production of etalons in accordance with the principles of the present invention, suitable for these and other types of applications.

Certain preferred embodiments of the etalons disclosed here comprise first and second Fabry-Perot thin film coatings on parallel opposite sides of a cavity formed by a bulk optic comprising a solid, optically transparent body and a wedge coating on a surface of the optically transparent body. The wedge coating underlies the first Fabry-Perot coating and the axial dimension of the bulk optic, i.e., the dimension of the bulk optic (with the wedge coating and any thickness-adjustment layer) in the direction of light passage, defines the cavity spacing of the etalon. As used here, in certain instances as will be clear from context, the term "bulk optic" refers to a component of the etalons disclosed above comprising a solid, optically transparent body, such as a portion of an optically transparent wafer diced into multiple pieces after being coated, together with the wedge coating and/or a thickness-adjustment layer. The solid, optically transparent body is an optically transparent substrate having first and second generally flat surfaces on opposite sides, which is self-supporting in the sense that it does not require an underlying support member to retain its shape and integrity during handling, packaging and transport in manners typical for optical elements intended for use as sensors, fiber optic communication system components or the like. Most preferably the transparent body of the bulk optic is a monolithic body, that is, a one-piece, unitary, self-supporting body of material. The wedge coating overlies a surface of the transparent body of the bulk optic, and there may or may not be a visible or discernable seam or interface between them. In certain preferred embodiments the wedge coating and optional thickness adjustment layer are formed of material that is the same as that of the transparent body. In other preferred embodiments, the wedge coating and/or thickness-adjustment layer are formed of a material comprising substantially the same refractive index as the material comprising the optically transparent body, e.g. the refractive indices differ by less than about ±0.01. It may, therefore, be difficult or impossible to see the boundaries between the bulk optic, the wedge-correction layer and the thickness-correction layer. It is, of course, desirable generally that there be no or substantially no optical effect at such boundaries which would adversely impact the performance of the etalon. Thus, the wedge coating and thickness-adjustment coating may be difficult or even impossible to distinguish from the material of the underlying optically transparent body, at least without observing the manner in which the etalon was produced. This typically will not be the case where different materials are used for the optically transparent body, wedge coating and thickness-adjustment coating. In any event, these components of the bulk optic are distinct from each other in the function they perform and in their position in the bulk optic.

As discussed further below, the substrate piece forming the body of the etalon preferably is one of many diced from a substantially planar substrate, e.g., a glass, indium phosphide, silica or silicon wafer. Other suitable materials and glasses will be apparent to those skilled in the art given the benefit of this disclosure. In preferred embodiments, the wafer has a diameter of about 0.5 to 8 inches and thickness between the first and second surfaces of about 0.2 to 2 mm. Dicing can occur after the wafer has received the wedge coating, thickness-adjustment layer and Fabry-Perot thin film coatings by physical vapor deposition, preferably sputter deposition. Thus, in these preferred embodiments the substrate piece forming the body of the etalon is diced from a larger body sufficiently self-supporting as to be suitable for mounting (with and without spinning) in a vacuum deposition chamber for depositing optically functional coatings or film stacks on one or both sides. The bulk optic component of the etalons disclosed here, in accordance with preferred embodiments, typically is a very small piece of such a wafer. While the wafer often is 4–12 inches in diameter or larger, the coated parallel surfaces of the bulk optic or finished etalon diced from the wafer will generally be in the size range of 0.5 to 5.0 mm across their largest dimension. Thus, numerous etalons can be obtained from each wafer.

Referring now to FIG. 1, an etalon 10 is seen to comprise a first thin film mirror coating 12 on surface 14 of bulk optic 15 which forms the etalon's cavity. Second thin film mirror coating 18 is deposited on parallel opposite surface 20 of the bulk optic. The two thin film mirror coatings 12 and 18 are shown as metal mono-layers, preferably identical layers. They are designed in accordance with known parameters to be selectively transparent to the wavelength(s) required by the intended use or application of the finished etalon. In certain embodiments, light that is incident on the selectively transparent surfaces of the etalon has an angle of incidence preferably ≦1°. One skilled in the art, given the benefit of this disclosure will be able to select an angle of incidence suitable for intended use and applications. Suitable fittings for launching light include, for example, a dual fiber collimator, a pair of single fiber collimators, an optical circulator, a 50/50 splitter used with a single fiber collimator, a fiber pigtail, and the like. It will be within the ability of those skilled in the art to employ suitable end fittings to optically launch optical signals into the etalons disclosed here. In certain embodiments the light is launched from an optical device, such as for example, a laser, collimator, drum lens, ball lens, grin lens, etc. One skilled in the art, given the benefit of this disclosure, will be able to select suitable optical devices for launching light. The bulk optic 15 comprises a solid, optically transparent body 22, wedge coating 24 overlying the optically transparent body, and thickness-adjustment layer 26 sandwiched between the wedge coating 24 and the Fabry-Perot thin film 12. The axial dimension of the bulk optic, i.e., the dimension of the bulk optic in the direction of light passage, defines the cavity spacing of the etalon. The precise optical thickness of the bulk optic will be adjusted slightly to compensate for the non-zero thickness of the metal films to preserve or optimize transparency at the precise wavelength(s) of interest. The optically transparent body 22 preferably is a monolithic body formed of silica or other suitable optical grade glass. The wedge coating and the thickness-adjustment layer each preferably is a layer of silica, most preferably being formed of the same material as the optically transparent body 22. Other suitable materials will be readily apparent to those skilled in the art given the benefit of this disclosure. The wedge coating can be seen in FIG. 1 to have a progressively increasing axial dimension from right to left in the cross-sectional view of FIG. 1. In a typical embodiment, the cross-sectional view obtained by cutting in a plane perpendicular to the plane of the paper in FIG. 1 would show a substantially constant axial dimension for the wedge layer. The combined thickness of wedge coating 24 and optically transparent body 22 is substantially constant over at least a large (i.e., sufficiently large for the intended use of the etalon) area of the etalon. Such parallelism is achieved in accordance with preferred embodiments through a combination of substrate polishing and the wedge coating. An optical wafer suitable for mounting in a sputtering chamber is subjected to a polishing process in accordance with known techniques and commercially available equipment. Such polishing processes typically produce finished substrates to within 2 arc seconds, preferably 1 to 2 arc seconds of wedge (shown exaggerated in FIGS. 1 and 2) and a wavefront error of less than 1/50 of a wave at 1550 nm. Low wavefront error will be understood in this context to mean that the thickness variation across the substrate is controlled by (i.e., essentially due to) the wedge. A wedge coating is then formed on one or both surfaces of the substrate to compensate for, that is, to offset, the wedge; net wedge after the wedge coating can be reduced to less than 0.1 arc second, less than 0.01 in preferred embodiments. The wedge coating can be formed by physical vapor deposition technique, such as magnetron sputtering or other sputtering method. Preferably the wedge coating is deposited on the optically transparent body by sputter deposition from a source in a vacuum chamber, the optically transparent body being mounted within the vacuum chamber without spinning during deposition and asymmetrical to the source. That is, in accordance with certain preferred embodiment, the substrate wafer is mounted in the vacuum chamber with no spinning and offset at an angle to the target or source. The thinner portion of the substrate is placed closest to the target to receive the highest rate of deposition. The thickest portion is furthest from the target. In preferred embodiments, the wedge coating is deposited so that the thickness of the wedge coating at its thickest point is less than 1 micron and more preferably less than 100 nm. Alternatively or in addition, shielding or other techniques can be used to achieve differential deposition rate across the substrate wafer. It will be within the ability of those skilled in the art to determine the proper distance and angle of offset to obtain good yield of wafer surface area having substantially uniform thickness. In that regard, substantially uniform, as that term is used here, means that the thickness of the wafer, including the bulk optic plus the wedge-correction layer, is sufficiently uniform over an area the size of a chip or segment to be cut later from the wafer, most preferably a large number of such chips or segments, to provide satisfactory optical precision in or as an etalon. Similarly, the precision of the thickness of the bulk optic with the thickness-correction layer added during thickness correction must be sufficient to provide satisfactory optical precision in the functioning of the etalon.

Figure 2B:
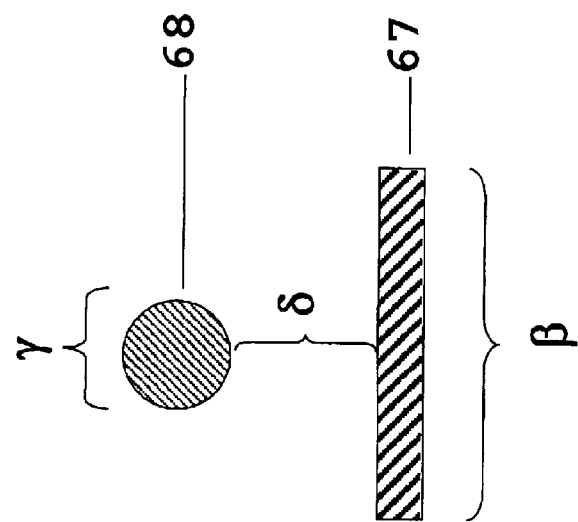
FIG. 2a is a schematic section view and FIG. 2b is a frontal view of a substrate positioned within a deposition chamber.
Figure 2A:
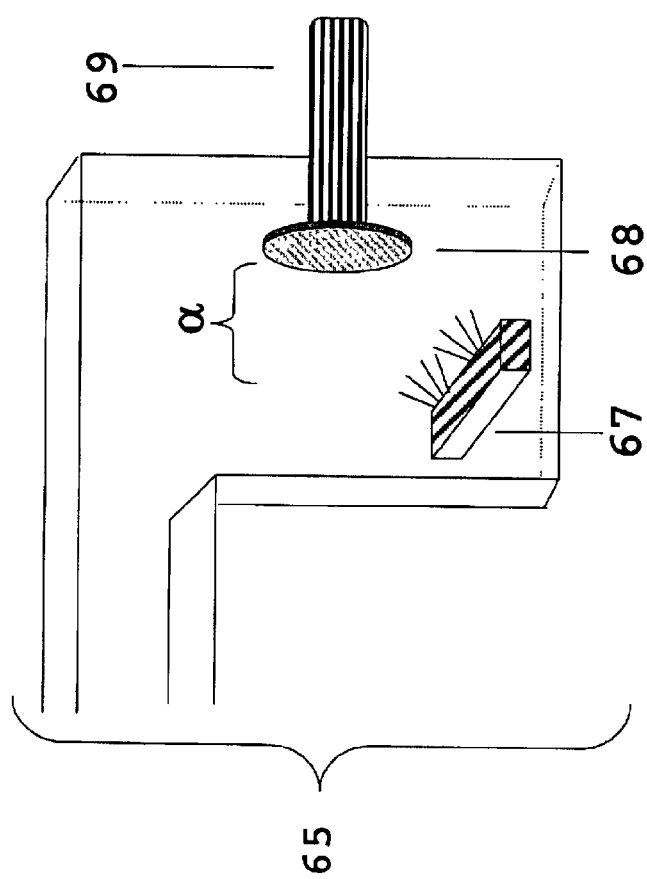

It will be within the ability of those skilled in the art to select or empirically determine suitable orientations and positions of the substrate within a deposition chamber to achieve suitable deposition of wedge coating onto the substrate. Referring to FIGS. 2a and 2b, an embodiment of a chamber suitable for depositing a wedge coating onto a substrate is shown. The chamber 65 comprises an elongate source or target 67, e.g. a rectangular source, and a substrate 68, for receiving a wedge coating, which is held in place by device 69. In preferred embodiments, the length β of target 67 is about three times larger than the diameter γ, or other length as the case may be, of the substrate 68. Target 67 may be positioned at distances α and δ from substrate 68. One skilled in the art, given the benefit of this disclosure, will be able to select or empirically determine dimensions for α and δ to achieve suitable deposition of wedge coating onto the substrate. The wedge coating is typically deposited without spinning substrate 68, and substrate 68 is positioned in the chamber so that the thinner portion of the substrate is placed closest to target 67 to receive the highest rate of deposition.

Total coating thickness to substantially eliminate a 1 arc second wedge is typically about 4–8 quarter waves (of the intended light wavelength that the etalon will be used with) at the thickest point. Preferably the coating is controlled by optical monitoring, most preferably monitoring of two points on the wafer substrate during deposition. Coating can be halted when the thickness is the same at the two points along the direction of wedge. It should be noted that for clarity of explanation, the optically transparent body is still treated here as having its original wedge; the bulk optic comprising both that body and the wedge layer has the substantially constant net thickness.

In the preferred embodiment of FIG. 1, the Fabry-Perot thin film coatings each comprises a sputter-deposited mono-layer of metal, that is, a single layer of metal such as would be deposited by sputter deposition without any intervening or other deposited layers (excepting, for example, anti-reflection films, transparent protective overcoats or the like, as those skilled in the art would recognize), and preferably without any intervening change of target material, vacuum chamber atmosphere or the like during deposition of the mono-layer. Exemplary metal layers (understood to include impurities, trace elements, optionally doping agents or the like, and to have an actual deposited form which may not be entirely a true metallic form) include silver, aluminum, etc. Other suitable materials will be readily apparent to those skilled in the art given the benefit of this disclosure. Such metal mono-layers in certain embodiments are slightly absorptive and the resulting etalon can be advantageously adapted for use as an induced transmission filter, useful for example in optical elements for certain medical applications.

As noted above, the bulk optic component of the etalon of FIG. 1 comprises a thickness-adjustment layer 26 of substantially uniform thickness. Such layers may be, e.g. 0–100 microns, typically being between 1 and 10 microns thick, preferably less than about 5 microns thick, for example about 2 microns thick. Optical monitoring, as described above, can be used to control deposition of the thickness-adjustment layer. The deposition is controlled such that total thickness achieved the half wave condition for the bulk optic component of the etalon, which corresponds to the wavelength at which the etalon is to be resonant.

Figure 3:
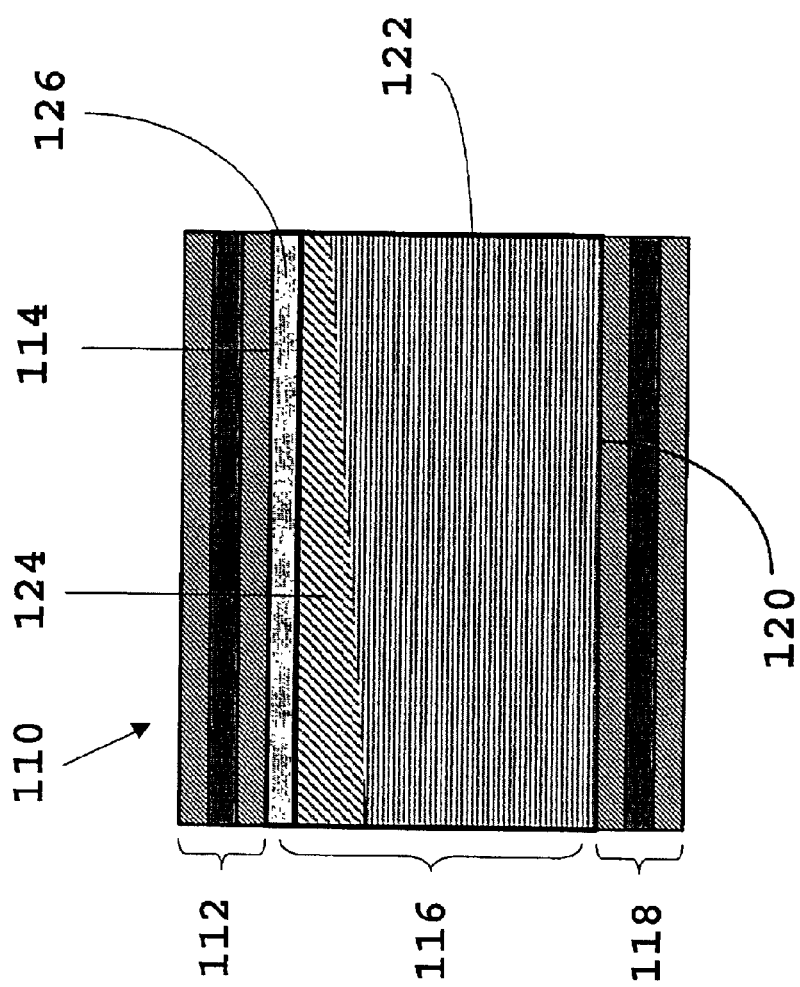
FIG. 3 is a schematic section view of an etalon in accordance with a second preferred embodiment.

Referring now to FIG. 3, an etalon 110 is seen to comprise a first thin film coating 112 on surface 114 of bulk optic 116 which forms the etalon's cavity. Second thin film 118 is deposited on parallel opposite surface 120 of the bulk optic. The bulk optic 116 comprises a solid, optically transparent body 122, wedge coating 124 overlying the optically transparent body, and thickness-adjustment layer 126 sandwiched between the wedge coating 124 and the thin film 112. The axial dimension of the bulk optic, i.e., the dimension of the bulk optic in the direction of light passage, defines the cavity spacing of the etalon. The optically transparent body 122 preferably is a monolithic body as described above in connection with the embodiment of FIG. 1. Materials suitable for the optically transparent body, wedge coating and thickness-adjustment layer include those discussed above. The Fabry-Perot thin film mirror coating 112 and 118 in the embodiment of FIG. 3 are dielectric film stacks of alternating high and low index of refraction. That is, the two thin film mirror coatings 112, 118 are formed of alternating sputtering-deposited layers of low refractive index material and high refractive index material, often referred to as H/L/H film stacks. For representative purposes, each is shown as having three films in its film stack; typically, as is well known to those skilled in the art, film stacks comprising many more alternating films may be used to achieve desired optical performance characteristics. Typically, coatings 112 and 118 will have substantially identical film stacks. Selecting a suitable number of alternating layers and suitable film materials will be within the ability of those skilled in the art given the benefit of this disclosure. Preferably the film stacks are deposited by reactive magnetron sputtering, ion beam sputtering or other suitable technique, a number of which will be readily apparent to those skilled in the art given the benefit of this disclosure. Exemplary dielectric materials for the high refractive index layers of the film stack include $Ta_2O_5$, $ZrO_2$, $TiO_2$, and $Al_2O_3$. Exemplary dielectric materials for the low refractive index layers of the film stack include $SiO_2$, MgF, etc. Additional suitable materials will be readily apparent to those skilled in the art given the benefit of this disclosure.

Figure 4:
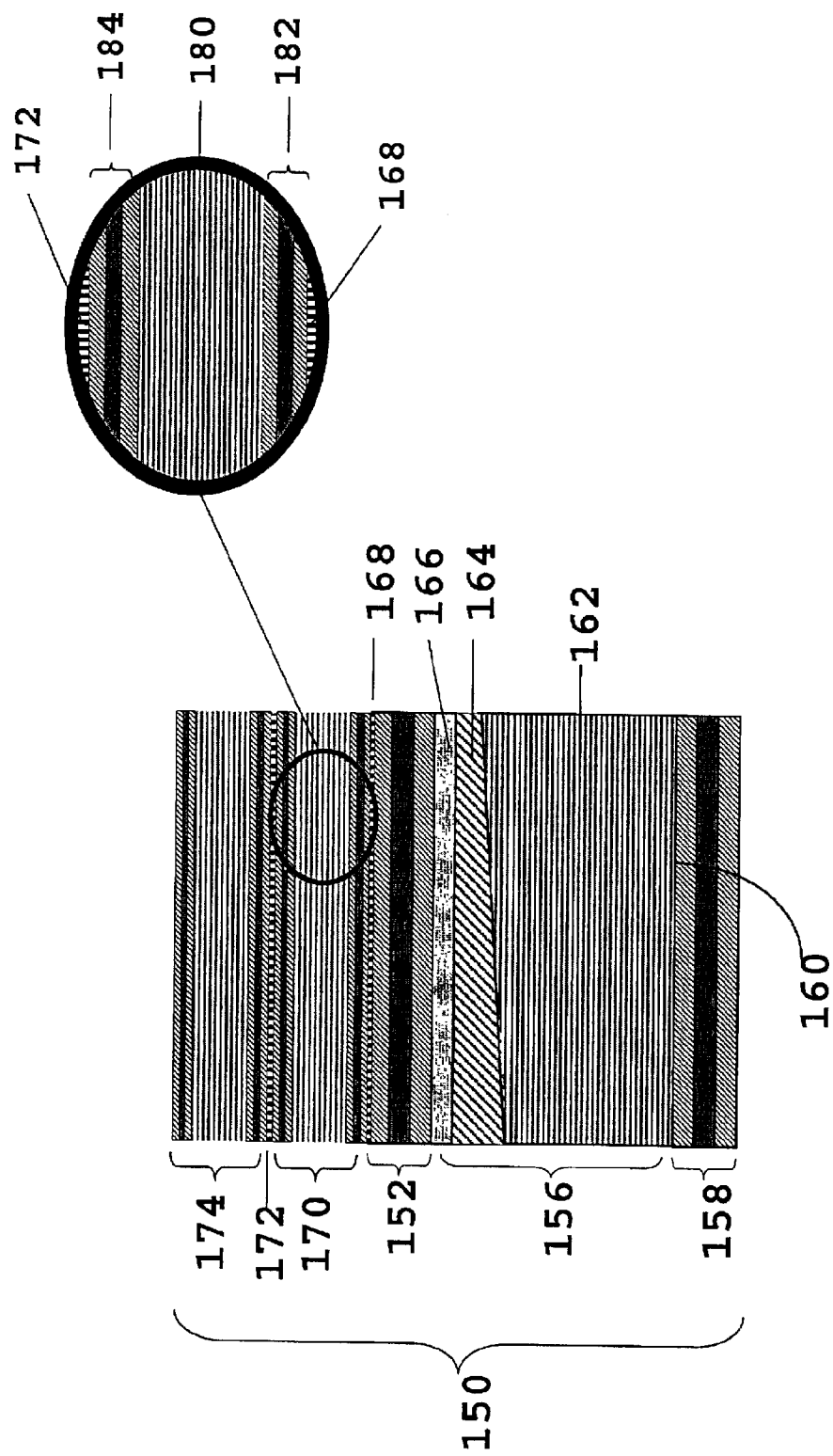
FIG. 4 is a schematic section view of an etalon comprising a thin film cavity deposited thereon.

In accordance with preferred embodiments, a multi-cavity etalon 150 comprising a bulk optic 156, thin film coatings 152 and 158, transition layers 168 and 172, and thin film etalons 170 and 174 is shown in FIG. 4. Typically the thin film etalons 170 and 174 are not optically matched with the bulk optic etalon but instead may be optically mismatched, e.g. the thin film etalon and the bulk optic etalon have a single common passband. Bulk optic 156 comprises an optically transparent body 162 and optionally a wedge coating 164 and thickness adjustment layer 166. On first side 160 of the bulk optic is thin film mirror coating 158. On the opposite side of the bulk optic is thin film mirror coating 152. After deposition of thin film mirror coatings 152 and 158, additional thin film coatings and cavity films may be deposited onto thin film coating 152 and/or onto thin film coating 158. Prior to deposition of the thin film coatings and cavity films of the thin film etalon, a first transition layer 168 is deposited using sputtering or other suitable techniques, e.g. ion beam sputtering, magnetron sputtering, etc. The first transition layer 168 is in direct surface-to-surface contact with thin film stack 152. Thin film coating 182, such as an H/L/H thin film stack for example, may be deposited onto transition layer 168. After deposition of thin film coating 182, a cavity film 180 may be deposited onto thin film coating 182. After deposition of the cavity film 180, second thin film coating 184 may be deposited onto cavity film 180. Therefore, a thin film etalon typically comprises a first thin film coating or stack, the cavity film, and a second thin film coating or stack. A second transition layer 172 may be deposited onto first thin film etalon 170, and the process just described may be repeated to provide deposition of additional thin film etalons, such as thin film etalon 174. In preferred embodiments, the thickness of the transition layer typically is an odd integer number (e.g. 1, 3, 5, 7 . . . ) of quarter wavelengths optical thickness (QWOTs). Typically the cavity film of the additional thin film etalons is deposited to a half-wave condition or an integral number of half waves. For example, in certain embodiments, the thickness of the cavity film can be from 1 to 10 half waves corresponding to about 0.5 to 5 microns for silica cavity film in an etalon operative in the C band. The thickness of the thin film coatings, of the thin film etalons, is preferably equal to an integral number of half waves.

In accordance with additional preferred embodiments, optical elements are provided comprising an etalon as disclosed above. Such optical elements may further comprise a bandpass filter optically coupled to the etalon to remove combing. Also, such optical elements may comprise a long wave or short wave pass filter optically coupled to the etalon. Also, such optical elements may comprise a temperature compensator joined to the etalon. Suitable temperature compensators are known to those skilled in the art, including for example the temperature compensators disclosed in U.S. Pat. No. 5,982,488 to Shirasaki and in U.S. Provisional Application No. 60/275,920 titled "Iso-Optical Thermal Compensator and Methods of Making and Using Same," the entire disclosures of which are incorporated herein by reference.

In accordance with other preferred embodiments, optical communication systems are provided comprising an etalon as disclosed above. It will be within the ability of those skilled in the art, given the benefit of this disclosure, to produce the etalons disclosed here, suitable for use in optical communication systems.

In accordance with other preferred embodiments, optical sensors are provided comprising an etalon as disclosed above. It will be within the ability of those skilled in the art, given the benefit of this disclosure, to produce the etalons disclosed here, suitable for use in optical sensors.

In accordance with certain preferred embodiments, methods are provided of making an etalon as disclosed above. Such methods comprise the step of polishing at least one surface of an optically transparent substrate to produce an optically transparent body having opposite sides parallel preferably to within 5 arc seconds, more preferably to within 2.0 arc seconds. As discussed above, typical commercial processes do not reliably give adequate thickness and/or parallelism for good yield of etalons intended for use in communication systems, etc. The methods further comprise depositing an optically transparent wedge coating on at least one of the opposite sides of the optically transparent body to produce a bulk optic having opposite sides parallel to within less than about 0.4 arc seconds, more preferably less than about 0.2 arc seconds, most preferably, for higher performance etalons, less than 0.1 arc second. Continual two-spot optical monitoring can be used to control deposition of the wedge coating as disclosed above. Reference here to "continually" monitoring thickness during deposition should be understood to meaning optionally, but not necessarily, monitoring continuously, and optionally monitoring regularly or repeatedly during the deposition.

The methods further comprise depositing a first selectively transparent thin film mirror coating on a first one of the opposite sides of the bulk optic and depositing a second such thin film coating on a second one of the opposite sides of the bulk optic to produce an etalon wherein the thickness of the bulk optic defines the cavity spacing of the etalon.

In accordance with certain preferred embodiments of the method described immediately above, approximately one-half of the total thickness of the desired wedge coating is deposited by sputter deposition, without rotation, onto a first side of an optically transparent substrate. The substrate and wedge coating may, for example, both be $SiO_2$. The first Fabry-Perot thin film coating is deposited over such wedge layer. The second one-half of the total thickness of the desired wedge coating then is deposited by sputter deposition, without rotation, onto the second side of the optically transparent substrate. Further, deposition then continues with substrate spinning until sufficient thickness is coated onto this second side to reach the desired total thickness, stopping deposition at a half wave condition. In accordance with certain preferred embodiments, the thickness-adjustment layer has a substantially uniform thickness between one and five microns. The second Fabry-Perot thin film coating is deposited over the wedge/thickness correction layer. In accordance with certain preferred embodiments, the first Fabry-Perot thin film coating and the second Fabry-Perot thin film coating are substantially identical and substantially optically transparent to at least one wavelength for which the etalon is resonant. Preferably, the transparent substrate is a wafer having a diameter greater than 3 inches and a thickness dependent on the intended optical properties. For production of optical bandpass filters, for example, having a bandpass every 200 GHz, for use in an optical communication system in the C-band, a wafer having a thickness of about 0.5 mm is suitable, with a finished thickness of about 0.5 mm for the etalon cavity after deposition of the wedge coating and thickness-adjustment layer.

In accordance with preferred embodiments, after deposition of the thin film stacks overlying the bulk optic, transition layers and thin film etalons can be deposited prior to removal of the etalon from the deposition apparatus, e.g. the thin film etalon may be deposited continuously after deposition of the wedge coating, thickness-adjustment layer, and thin film mirror coatings of the bulk optic etalon. That is, transition layers and thin film etalons may be deposited in a continuous manner after assembly of the bulk optic etalon. A first transition layer comprising materials similar to the bulk optic, wedge coating, and thickness-adjustment layer, such as silica for example, may be deposited onto the thin film stacks of the bulk optic etalon. After depositing a first transition layer, first thin film coating, such as an H/L/H thin film stack for example, may be deposited, in accordance with the methods and embodiments discussed above. A cavity film may subsequently be deposited onto the thin film coating overlying the first transition layer. The cavity film may comprise any suitable material known to those skilled in the art including but not limited to those materials disclosed above that comprise the bulk optic etalon. After deposition of the cavity film, second thin film coating, such as an H/L/H thin film stack for example, may be deposited onto the cavity film. Prior to deposition of additional thin film etalons, transition layers may be deposited to separate the multiple thin film etalons. One skilled in the art, given the benefit of this disclosure, will be able to deposit additional transition layers and thin film etalons suitable for use in optical systems and optical sensors, such as those used in the telecommunications industry.

For etalons intended for the same application but having a bandpass every 100 GHz, a substrate wafer having a thickness of about 1.0 mm is suitable. For etalons intended for the same application but having a bandpass every 50 GHz, a wafer having a thickness of about 2.0 mm is suitable.

In general it will be within the ability of those skilled in the art, given the benefit of this disclosure, to select substrate wafers of suitable thickness for forming the bulk optic cavity of the optical elements disclosed here. Similarly, it will be within the ability of those skilled in the art, given the benefit of this disclosure, to deposit wedge coatings and thickness-adjustment layers of suitable thickness on such substrate to produce etalon cavities having optical thickness proper for the intended application of the optical element.

The method further comprises the step of dicing the wafer into multiple etalons following deposition of the first and second Fabry-Perot thin film coatings. Dicing the wafer typically is accomplished by sawing or grinding through the wafer in accordance with methods and equipment whose applicability to the present invention will be readily apparent to those skilled in the art, given the benefit of the present invention. The parallel sides of such diced etalons, having the Fabry-Perot thin film coating thereon, preferably are about 0.5 to 5.0 mm across the largest dimension.

For illustrative purposes only and without limitation, an example of this novel technology is described below.

EXAMPLE

Example 1

Bulk Optic+Wedge Coating,+Thickness Adjustment Layer

An etalon having a periodic passband every 200 GHz in accordance with the disclosure above is prepared as follows. A 2 inch diameter wafer of silica approximately 0.5 mm thick is sliced from a log of that diameter. The wafer is planarized using commercial polishing techniques. The resulting wafer has a physical thickness of approximately 0.5 mm at its thickest point with a wedge angle of 2 arc sec. Additional thickness measurements establish that thickness change progressively; that is, thickness of the wafer varies substantially linearly from the thinnest to the thickest point. The wedge angle is corrected by coating. Specifically, the wafer is mounted in a vacuum chamber equipped for ion beam sputtering from a silica target. The wafer is mounted stationary, i.e., without spinning, and offset from the source at an angle of approximately 45 degrees, with the thinnest point of the wedge closest to the source (for example, approximately 8 inches). During sputtering, the thickness of the wafer is continually optically monitored. Deposition is continued for up to three hours, after which optical monitoring indicates substantial uniformity of wafer thickness. The wafer is then removed from the vacuum chamber. The physical thickness of the wafer is measured and found to have less than about 10 nm of runout.

Following such wedge correction, the precise thickness of the bulk optic is adjusted by further coating with silica Specifically, the wafer is mounted in a vacuum chamber equipped for sputtering from a silica target. The wafer is mounted for spinning during deposition, and thickness of the wafer is continually optically monitored. Deposition is halted when optical monitoring indicates that the total thickness of the bulk optic, including the original planarized wafer, wedge coating and thickness-correction layer is within about 10 nm of desired thickness. An H/L/H type mirror stack (partial reflection) is then deposited on each surface of the wafer by sputtering the thin film stack comprising 3 alternating layers of silica and $Ta_2O_5$ for example. Following deposition, the etalon is tested and tuned to have a center wavelength of approximately 1550.12 nm. The etalon can be further tuned for wavelength, if necessary, using angle, heat treatment, strain, temperature control or other means.

The optical performance of the etalon produced as described immediately above is tested without temperature compensation at an operating temperature of 20° C.±2° C. Performance results are shown in the table below:

| Performance | |
| --- | --- |
| Bandwidth (0.5 dB) | >0.1 nm |
| Insertion loss | <0.1 dB |
| Isolation (10 dB) | <1.25 nm |
| Polarization dependent loss (PDL) | <0.1 dB |
| Temperature coefficient | <0.012 nm/° C. |

Figure 5:
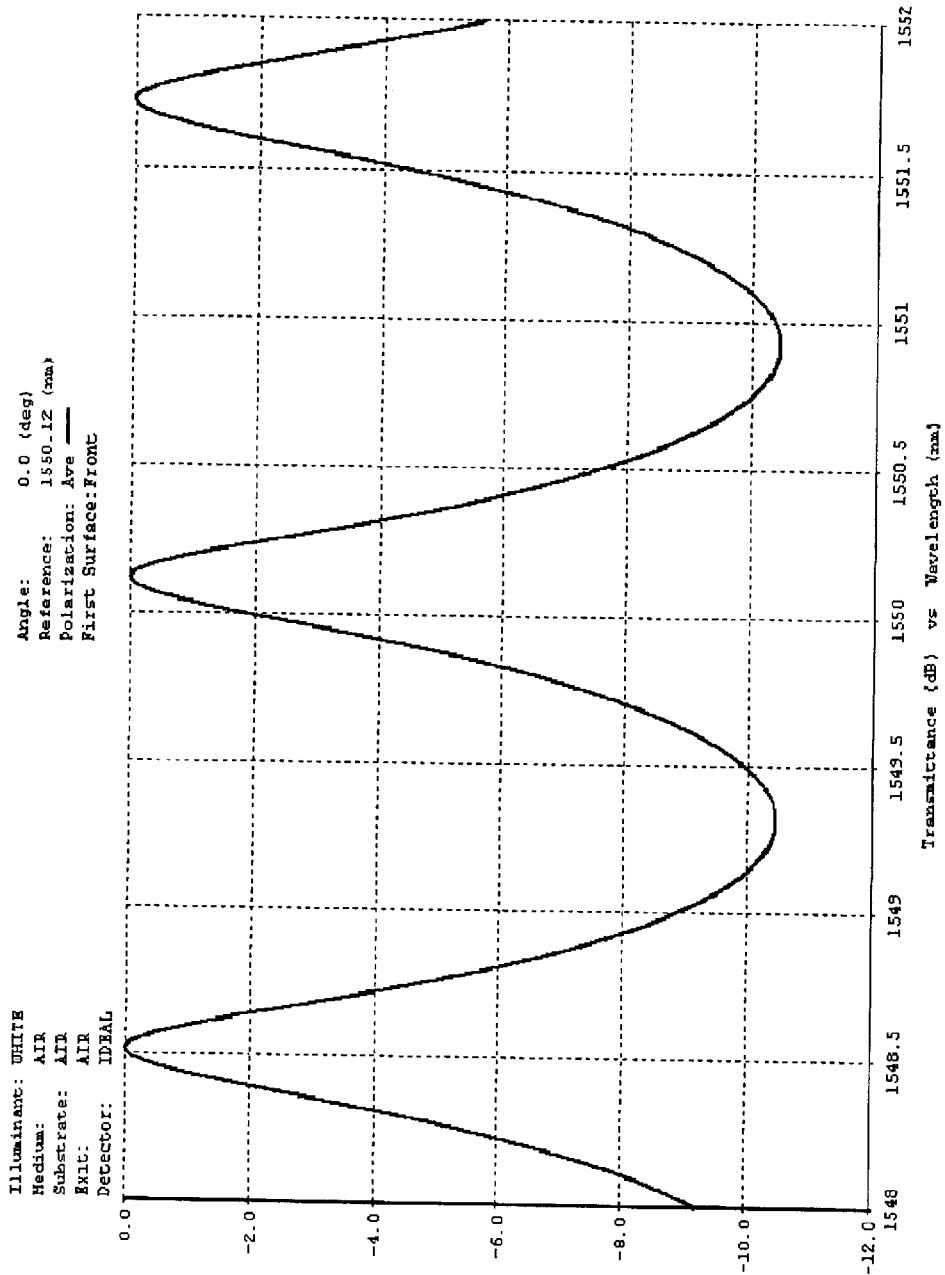
FIG. 5 is a graphical representation of the optical performance of an etalon in accordance with a preferred embodiment, produced in the manner described in Example 1, below.

The passband shape of the etalon is shown in FIG. 5. As seen in the table above and from the wave form shown in FIG. 5, the etalon produced in accordance with this example has good optical performance characteristics and would be suitable for use in an optical element intended for an optical telecommunication system.

Although the present invention has been described above in terms of specific embodiments, it is anticipated that other uses, alterations and modifications thereof will become apparent to those skilled in the art given the benefit of this disclosure. It is intended that the following claims be read as covering such alterations and modifications as fall within the true spirit and scope of the invention.

What is claimed is:

1. An etalon comprising first and second selectively transparent thin film mirror coatings on opposite surfaces of a cavity formed by a bulk optic comprising a solid, optically transparent body and a wedge coating on a surface of the optically transparent body underlying the first thin film coating, the bulk optic defining the cavity spacing of the etalon, wherein the optically transparent body has a thickness of 0.2 mm to 2.0 mm, with a wedge of less than 2 arc seconds.

2. The etalon of claim 1, wherein the optically transparent body has a wedge of less than 1 arc second.

3. An etalon comprising first and second selectively transparent thin film mirror coatings on opposite surfaces of a cavity formed by a bulk optic comprising a solid, optically transparent body and a wedge coating on a surface of the optically transparent body underlying the first thin film coating, the bulk optic defining the cavity spacing of the etalon, wherein the wedge coating is sputter-deposited material having a thickness at its thickest point of less than 100 nm.

4. The etalon of claim 3, wherein the bulk optic has a wedge of less than 0.1 arc second.

5. An etalon comprising first and second selectively transparent thin film mirror coatings on opposite surfaces of a cavity formed by a bulk optic comprising a solid, optically transparent body and a wedge coating on a surface of the optically transparent body underlying the first thin film coating, the bulk optic defining the cavity spacing of the etalon, further comprising a transition layer on the first selectively transparent thin film mirror coating and a thin film etalon on the transition layer.

6. The etalon of claim 5, wherein the thin film etalon comprises first and second selectively transparent thin film mirror coatings on opposite first and second surfaces, respectively, of a cavity film.

7. An etalon comprising first and second selectively transparent thin film mirror coatings on opposite surfaces of a cavity formed by a bulk optic comprising a solid, optically transparent body and a wedge coating on a surface of the optically transparent body underlying the first thin film coating, the bulk optic defining the cavity spacing of the etalon, wherein light incident on the thin film mirror coatings has an angle of incidence of less than or equal to 1 degree.

8. An etalon comprising first and second selectively transparent thin film mirror coatings on opposite surfaces of a bulk optic comprising a solid, optically transparent body and a thickness adjustment layer of substantially uniform thickness on a surface of the optically transparent body, the bulk optic defining the cavity spacing of the etalon, wherein the optically transparent body has a thickness of 0.5 mm to 2.0 mm and a wedge of less than 1 arc second.

9. An etalon comprising first and second selectively transparent thin film mirror coatings on opposite surfaces of a bulk optic comprising a solid, optically transparent body and a thickness adjustment layer of substantially uniform thickness on a surface of the optically transparent body, the bulk optic defining the cavity spacing of the etalon, further comprising a transition layer on the first selectively transparent thin film mirror coating and a thin film etalon on the transition layer.

10. The etalon of claim 9, wherein the thin film etalon comprises first and second selectively transparent thin film mirror coatings on opposite first and second surfaces, respectively, of a cavity film.

11. An etalon comprising first and second selectively transparent thin film mirror coatings on opposite surfaces of a bulk optic comprising a solid, optically transparent body and a thickness adjustment layer of substantially uniform thickness on a surface of the optically transparent body, the bulk optic defining the cavity spacing of the etalon, wherein light incident on the thin film mirror coatings has an angle of incidence of less than or equal to 1 degree.

\* \* \* \* \*